US012323850B2

(12) United States Patent
Polaganga

(10) Patent No.: US 12,323,850 B2
(45) Date of Patent: Jun. 3, 2025

(54) DYNAMIC ASSIGNMENT OF UPLINK DISCARD TIMERS

(71) Applicant: T-MOBILE INNOVATIONS LLC, Overland Park, KS (US)

(72) Inventor: Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 560 days.

(21) Appl. No.: 17/847,398

(22) Filed: Jun. 23, 2022

(65) Prior Publication Data
US 2023/0422080 A1   Dec. 28, 2023

(51) Int. Cl.
H04W 28/02   (2009.01)
(52) U.S. Cl.
CPC ... H04W 28/0268 (2013.01); H04W 28/0236 (2013.01); H04W 28/0289 (2013.01)
(58) Field of Classification Search
CPC ......... H04W 28/0268; H04W 28/0236; H04W 28/0289
See application file for complete search history.

(56) References Cited

U.S. PATENT DOCUMENTS

| | | | |
|---|---|---|---|
| 10,547,558 B2 | 1/2020 | Chan et al. | |
| 11,212,818 B2* | 12/2021 | Ahmed | H04W 28/0231 |
| 2013/0040683 A1* | 2/2013 | Siomina | H04W 24/08 |
| | | | 455/517 |
| 2016/0112896 A1* | 4/2016 | Karampatsis | H04L 47/22 |
| | | | 370/230.1 |
| 2018/0351873 A1* | 12/2018 | Chan | H04W 28/0278 |
| 2019/0174349 A1* | 6/2019 | Sun | H04W 72/535 |
| 2019/0306750 A1* | 10/2019 | Bergström | H04W 28/0865 |
| 2020/0037334 A1* | 1/2020 | Pao | H04B 7/0619 |
| 2020/0305186 A1* | 9/2020 | Alfarhan | H04W 80/08 |
| 2021/0029777 A1* | 1/2021 | Lv | H04W 80/02 |
| 2021/0100061 A1* | 4/2021 | Park | H04W 76/25 |
| 2021/0105787 A1* | 4/2021 | Park | H04W 72/542 |
| 2022/0038955 A1* | 2/2022 | Hande | H04W 28/10 |
| 2022/0053367 A1* | 2/2022 | Rao | H04L 1/188 |
| 2022/0109622 A1* | 4/2022 | Yeh | H04L 69/40 |
| 2022/0124543 A1* | 4/2022 | Orhan | G06N 3/006 |
| 2022/0132603 A1* | 4/2022 | Adjakple | H04W 8/005 |
| 2022/0191733 A1* | 6/2022 | Ali | H04L 43/16 |

(Continued)

FOREIGN PATENT DOCUMENTS

CN   109640356 A   *   4/2019   ........ H04W 28/0289

*Primary Examiner* — Chi H Pham
*Assistant Examiner* — Vladislav Y Agureyev
(74) *Attorney, Agent, or Firm* — Jones Robb, PLLC

(57) ABSTRACT

Systems and methods are provided for assigning PDCP discard timers to wireless devices with active non-GBR sessions. The systems and methods evaluate cell utilization for a cell with respect to a cell utilization threshold and define the cell as congested or non-congested based on the evaluation. Further, RF conditions are evaluated for the wireless device with respect to a first RF conditions threshold for the non-congested cell and a second RF conditions threshold for the congested cell. Systems and methods further select a discard timer for the wireless device based on the evaluation of the cell utilization with respect to the cell utilization threshold and the evaluation of the RF conditions with respect to the RF conditions thresholds.

20 Claims, 7 Drawing Sheets

(56) References Cited

U.S. PATENT DOCUMENTS

| | | | |
|---|---|---|---|
| 2023/0422080 A1* | 12/2023 | Polaganga | H04W 28/0289 |
| 2024/0121161 A1* | 4/2024 | Chen | H04W 24/02 |
| 2024/0259879 A1* | 8/2024 | Ranganath | H04L 41/5054 |
| 2024/0267814 A1* | 8/2024 | Kim | H04W 76/15 |

* cited by examiner

DYNAMIC ASSIGNMENT OF UPLINK DISCARD TIMERS

TECHNICAL BACKGROUND

A wireless network, such as a cellular network, can include an access node (e.g., base station) serving multiple wireless devices or user equipment (UE) in a geographical area covered by a radio frequency transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)).

As access nodes have evolved, networks may include a combination of multiple access node such as 4G LTE evolved NodeBs (eNodeBs or eNBs) and 5G NR next generation NodeBs (gNodeBs or gNBs) or alternatively may be exclusively 4G or 5G cellular systems. 5G networks aim to offer new technical solutions allowing for a greater throughput, lower latency, higher reliability, higher connectivity, and higher mobility range than previous technologies. 5G networks are also expected to extend the flexibility in the network usage and to enable users with a wider range of use cases and business models.

Within the above-described networks, Transmission Control Protocol (TCP) is a transport level protocol that defines how applications create communication channels. TCP is one of the main protocols of the Internet protocol suite. TCP is connection-oriented, and a connection between client and server is established before data can be sent. The server must be listening for connection requests from clients before a connection is established.

TCP can be implemented to set up a connection between a client and a server using a three-way hand-shake. During connection set-up, packet loss can occur either because a packet is lost in transit or because it is dropped due to network congestion. TCP assumes that packet loss is due to congestion and therefore it reduces the number of bytes it has in flight (congestion window). Discarding packets can reduce the TCP congestion window thereby resulting in a shorter queue. Low queuing delay results in maintenance of high link utilization, thereby improving perceived end-user performance in terms of system responsiveness without sacrificing throughput.

A Packet Data Convergence Protocol (PDCP) Service Data Unit (SDU) discard timer dictates the age of packets kept in the queue and is applicable in both downlink and uplink directions. An access node, such as the eNB in 4G networks and the gNB in 5G networks usually implements the discard timer for downlink transmission. For uplink transmission, the access node configures the wireless device or user equipment (UE) to use a SDU discard timer of the PDCP layer. For each PDCP SDU received from the higher layers in the transmitter, a timer is started, and when the transmission of the PDCP SDU has not yet been initiated in the UE at the expiry of this timer, the PDCP SDU is discarded. If the timer is set to an appropriate value for the required quality of service (QoS) of the radio bearer, this discard mechanism can prevent excessive delay and queuing in the transmitter.

In current implementations, the SDU discard timer is a static discard timer and is assigned to all UEs being served by the access node. Bottlenecks in the uplink are common both because the typical browsing session is UE initiated and because all UEs are configured with the same value per service type irrespective of their radio frequency (RF) conditions. Further, RF is always uplink limited. Assignment of a static discard timer to all UEs fails to optimize performance for the UEs in the network. For example, users attempting to load a web page in poor RF conditions and failing to get a response may ultimately end the session rather than waiting for the web page to load.

Accordingly, a solution is needed that dynamically assigns a discard timer to UEs experience varying RF conditions. Such a solution should optimize perceived user experience per UE.

OVERVIEW

Exemplary embodiments described herein include systems, methods, and non-transitory computer readable mediums for dynamic assignment of discard timers. An exemplary method includes evaluating cell utilization for a cell with respect to a cell utilization threshold. The method further includes identifying a wireless device session for a wireless device within the cell as a non-guaranteed bit rate (GBR) session and evaluating RF conditions for the wireless device with respect to an RF conditions threshold. The method additionally includes selecting a discard timer for the wireless device based on the evaluation of the cell utilization with respect to the cell utilization threshold and the evaluation of the RF conditions with respect to the RF conditions threshold.

An additional exemplary embodiment includes a system for dynamic assignment of discard timers. The system includes at least one processor programmed to perform multiple operations. The operations include evaluating cell utilization for a cell with respect to a cell utilization threshold and defining the cell as congested or non-congested based on the evaluation. The operations additionally include evaluating RF conditions for the wireless device with respect to a first RF conditions threshold for the non-congested cell and a second RF conditions threshold for the congested cell. The operations further include selecting a discard timer for the wireless device based on the evaluation of the cell utilization with respect to the cell utilization threshold and the evaluation of the RF conditions with respect to the RF conditions thresholds.

In yet a further exemplary embodiment, a method includes evaluating cell utilization for a cell with respect to a cell utilization threshold and defining the cell as congested or non-congested based on the evaluation. The method additionally includes evaluating RF conditions for the wireless device with respect to a first RF conditions threshold for the non-congested cell and a second RF conditions threshold for the congested cell and selecting a discard timer for the wireless device based on the evaluation of the cell utilization with respect to the cell utilization threshold and the evaluation of the RF conditions with respect to the RF conditions thresholds.

In yet further embodiments, a non-transitory computer readable medium storing instructions for execution by a processor is provided. When executed by a processor, the instructions cause multiple operations and steps to be performed as set forth above.

DETAILED DESCRIPTION

Figure 1:
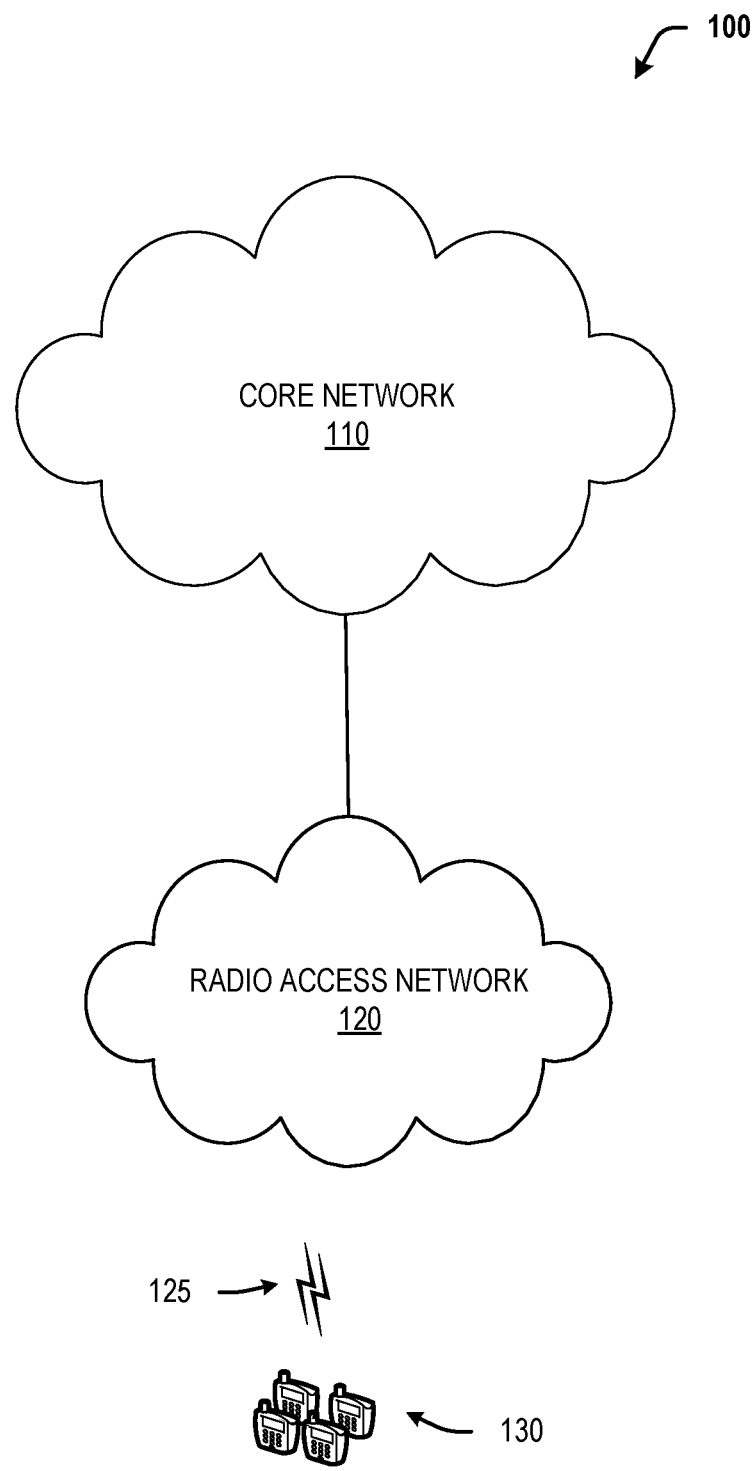
FIG. 1 depicts an exemplary system for wireless communication, in accordance with the disclosed embodiments.

Exemplary embodiments described herein include systems, methods, and computer readable mediums for assigning a discard timer to a wireless device or to a group of wireless devices. More specifically, embodiments set forth herein include enhanced logic for assigning discard timers to wireless devices based on RF conditions for the particular wireless device. The assignment of discard timers may also be based on other factors including, bandwidth considerations, cell utilization, and UE session activity. Thus, embodiments set forth herein dynamically change and assign a PDCP discard timer per UE for optimal user perceived experience.

Bearers in wireless networks have quality of service (QoS) requirements, such as, for example, delay budget. Due to such requirements, when the PDCP layer receives a PDCP SDU, it starts the SDU discard timer for each received packet. If this received PDCP SDU is not transmitted in reasonable time frame as determined by the timer, it will be too late for a receiver application to accept this packet.

In embodiments set forth herein, for guaranteed bit rate (GBR) traffic, the PDCP SDU timer threshold is a standard value, such as that given by a packet delay budget value per 3GPP TS23.203. However, for non-GBR traffic like data (QCI5-9 in LTE for example), the UE or access node (eNB/gNB) discards a packet only once it reaches a threshold of age in buffer, thereby maintaining a minimum of packets in the buffer, ensuring that the link utilization is high while keeping the queuing delay low. Embodiments set forth herein make sure the described discard timer is optimal per unique non-GBR UE session without making it too large or too small.

As will be described herein, this implementation improves upon the 'one-size-fits-all' approach with a static discard timer assigned to all UEs being served by the eNB/gNB to be used in uplink per QCI. The technique as described herein dynamically assign this uplink discard timer value per UE depending on UE radio conditions to provide more robust user-perceived experience.

In embodiments set forth herein, the technique for dynamically assigning an uplink timer value per UE is utilized when a cell bandwidth is below an operator defined threshold. For higher bandwidths, a default or pre-existing timer value may be effective. However, lower bandwidths have been found to result in an increased number of data stalls. Accordingly, a longer timer value may be appropriate for lower bandwidths.

Furthermore, multiple discard timers may be created and may be assigned to UEs within a cell based on whether the cell is congested or non-congested. The determination of whether a cell is congested or non-congested may be based on a cell utilization threshold.

Furthermore, a specific discard timer may be assigned based on UE measurements of RF conditions. The measurements may, for example, include reference signal received power (RSRP) and/or reference signal received quality (RSRQ). In additional embodiments, an access node may assign a specific discard timer based on timing advance criteria. For example, UEs near a cell edge may be assigned a different timer than UEs near the cell center.

In embodiments set forth herein, the network may be a 5G NR network or a combined 4G/5G network. The method may be applied during a TCP three way hand shake any time a UE user browses. When the system dynamically sets a longer discard timer, the UE may need to retain a packet for a longer time period before it is discarded.

An exemplary system described herein includes at least an access node (or base station), such as an eNodeB, or gNodeB, and a plurality of end-user wireless devices. The disclosed technology may be applied to communication between an end-user wireless device and an access node (e.g., base station) and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations of dynamic discard timer assignment may be implemented as computer-readable instructions or methods and processing nodes on the network for executing the instructions or methods. The processing node may include a processor included in the access node or a processor included in any controller node in the wireless network that is coupled to the access node.

FIG. 1 depicts an exemplary communication network 100. A core network 110 is coupled to a radio access network (RAN) 120 that serves wireless devices 130 over communication links 125. For example, the wireless devices 130 can be end-user wireless devices (e.g., UEs), communication links 125 use 5G NR, 4G LTE, or any other suitable type of radio access technology (RAT), and core network 110 can be structured using a service-based architecture (SBA) utilizing core network functions and elements, including, for example, user plane functions (UPF) control plane functions (CPF).

The RAN 120 can include various access network functions and devices disposed between the core network 110 and the end-user wireless devices 130. For example, the RAN 120 includes at least an access node (or base station), such as an eNodeB and/or gNodeB communicating with the plurality of end-user wireless devices 130. It is understood that the disclosed technology may also be applied to communication between an end-user wireless device and other network resources, depending on the RAT and network technology being implemented. Further, either of core network 110 and radio access network 120 can include one or more of a local area network, a wide area network, and an internetwork (including the Internet) and capable of communicating signals and carrying data, for example, to support voice, push-to-talk, broadcast video, and data communications by end-user wireless devices 130. Alternatively or additionally to the UPF and CPF, the illustrated network topology can include packet gateways, such as a CUPS based user plane S-GW, P-GW, or SAE-GW.

The core network 110 may incorporate many functions not shown in FIG. 1. For example, the CPF may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The UPF may also include, for example, a Unified Data Repository (UDR). The CPF can provide one or more network functions based on a request-response or subscribe-notify model. The network functions may form a micro services-based architecture, which may include network functions distributed over different cloud infrastructures. Additionally, many services may span different network functions and domains that work in unison.

The NRF maintains the list of available network functions and their profiles. The NRF maintains an updated repository of the network components along with services provided by each of the elements in the core network. The NRF additionally provides a discovery mechanism that allows the elements to discover each other. The NRF provides a registration function that allows each network function to register a profile and a list of services with the NRF. It also performs services registration and discovery so that different network functions can find each other. As one example, the SMF, which is registered to NRF, becomes discoverable by the AMF when a UE or other device tries to access a service type served by the SMF. The NRF broadcasts available services once they are registered in the 5G core 110. To use other network functions, registered functions can send service requests to the NRF.

The UDM interfaces with network functions such as AMF and SMF so that relevant data becomes available to AMF and SMF. The UDM generates authentication vectors when requested by the AUSF, which acts as an authentication server. The AMF performs the role of access point to the 5G core, thereby terminating RAN control plane and UE traffic originating on either the N1 or N2 reference interface. In the 5G core, the functionality of the 4G Mobility Management Entity (MME) is decomposed into the AMF and the SMF. The AMF receives all connection and session related information from the UE using N1 and N2 interfaces, and is responsible for handling connection and mobility management tasks.

The UDR may provide unified data storage accessible to both control plane NFs and user plane NFs. Thus, the UDR may be a repository shared between control plane NFs and the UPF. The UDR may include information about subscribers, application-specific data, and policy data. The UDR can store structured data that can be exposed to an NF. The UPF may perform operations including, but not limited to, packet routing and forwarding, packet inspection, policy enforcement for the user plane, Quality-of-Service (QoS) handling, etc. When compared with 4G EPC, the functions of the UPF may resemble those of the SGW-U (Serving Gateway User Plane function) and PGW-U (PDN Gateway User Plane function).

Wireless devices 130 may be any device, system, combination of devices, or other such communication platform capable of communicating wirelessly with RAN 120 using one or more frequency bands deployed therefrom. Each of wireless devices 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via RAN 120. Other types of communication platforms are possible.

Additionally, in recent years, networks have evolved to connect with the Internet of things (IoT), which describes the network of physical objects or things that are embedded with sensors, software, and other technologies for the purpose of connecting and exchanging data with other devices and systems over the Internet. Cellular IoT is a way of connecting physical things, such as sensors to the internet by having them utilize the same mobile networks as wireless devices. In the consumer market, IoT technology is frequently utilized to equip the "smart home", including devices and appliances such as lighting fixtures, thermostats, home security systems and cameras, and other appliances that support one or more common ecosystems, and can be controlled via devices associated with that ecosystem, such as smartphones and smart speakers. Cellular IoT itself is a rapidly growing ecosystem based on Third Generation Partnership Project (3GPP) global standards, supported by an increasing number of mobile network providers as well as device, chipset, module, and network infrastructure vendors. It improves over other low power wide area (LPWA) network technologies in terms of quality of service (QoS), scalability, and flexibility.

Cellular IoT applications generally use one of two technologies: narrowband (NB)-IoT and Category M1 (Cat-M1), which are both 3GPP standardized technologies. The technologies address different types of use cases based on their capabilities.

NB-IoT supports devices with very narrow bandwidth, 200 kHz. Due to its narrow bandwidth, the data rate peaks at around 250 kilobits per second (kbps). An NB-IoT carrier can be deployed even in guard-band of an LTE carrier. Common use cases of NB-IoT include utility meters and sensors. NB-IoT provides advantages including low complexity, low cost, ubiquitous coverage, low data rate and low power computing. NB-IoT is particularly suitable for transferring small amounts of information as it uses only a narrow band. With extreme coverage capability, NB-IoT is ideal for supporting very low data rate applications in extremely challenging radio conditions.

Cat-M1 operates at 1.4 MHz bandwidth with higher device complexity/cost than NB-IoT. The wider bandwidth allows Cat-M1 to achieve greater data rates (up to 1 Mbps), lower latency and more accurate device positioning capabilities. Cat-M1 supports voice calls and connected mode mobility. Common uses cases for Cat-M1 include connected vehicles, wearable devices, trackers, and alarm panels. Both NB-IoT and Cat-M1 devices can sleep for extended periods of time, which greatly reduces device power consumption.

Accordingly, the wireless devices 130 may include Cat-M1 and/or NB-IoT devices in addition to more traditional wireless devices. In embodiments set forth herein, both Cat M1 and NB-IoT devices as well as hybrid devices capable of utilizing both technologies may operate within a cell simultaneously.

Other network elements may be present to facilitate communication but are omitted for clarity, such as base stations, base station controllers, mobile switching centers, dispatch application processors, and location registers such as a home location register or visitor location register. Components not specifically shown in FIG. 1 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

Figure 2:
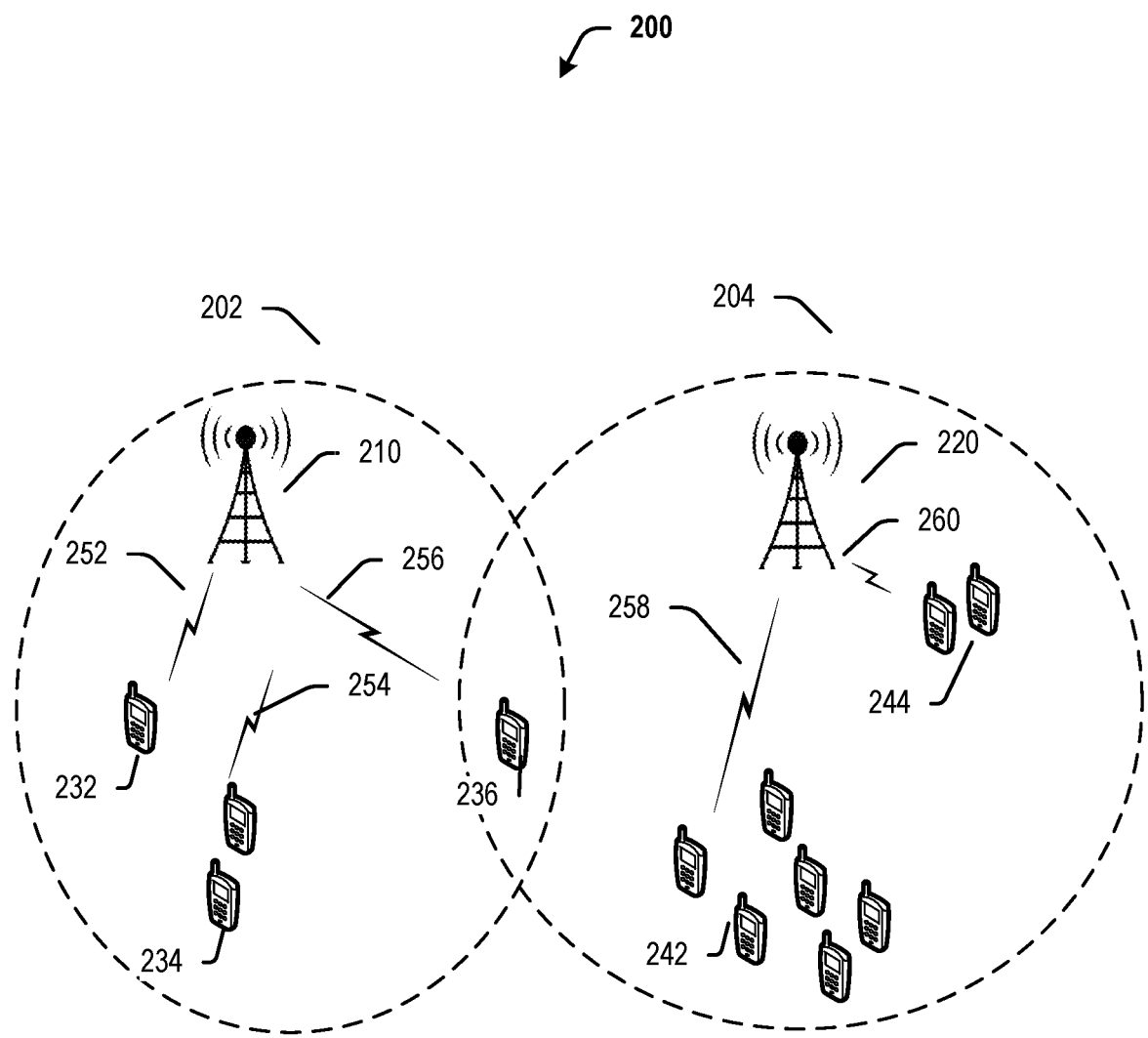
FIG. 2 depicts a RAN serving UEs with differing RF conditions in accordance with the disclosed embodiments.

FIG. 2 illustrates a RAN configuration 200 in which multiple access nodes 210, 220 have coverage areas 202,

204. The access nodes 210 and 220 communicate with multiple wireless devices 232, 234, 236, 242, 244 over wireless links 252, 254, 256, 258, 260. In embodiments set forth herein, the wireless links 252, 254, 256, 258, and 260 may correspond to different frequency bands and different bandwidths. Further, the wireless devices 232, 234, 236, 242, and 244 may be varying distances from the access nodes 210 and 220 and be experiencing varying RF conditions.

Access node 210 may be or include a gNB and/or eNB. The wireless device 232 may be close to the access node 210 or within a predetermined distance from the cell center and thus may experience favorable RF conditions. The wireless devices 234 may be closer to a cell edge and thus may experience less favorable RF conditions. Further, the wireless device 236 may be in area experiencing interference and thus may also experience less favorable RF conditions.

Access node 220 may be or include a gNB and/or eNB. The wireless devices 244 may be close to the access node 220 and thus may experience favorable RF conditions. The wireless devices 242 may be near or within a predetermined distance from the cell edge and may experience less favorable conditions. As further described herein, wireless links 258 and 260 may represent communications over different frequency bands having varying bandwidths.

Each of the wireless devices 232, 234, 236, 242, 244 may run different applications. While some of the wireless devices 232, 234, 236, 242, 244 may be engaged in sessions using GBR application, others may be implementing non-GBR applications. Further, as will be further explained below, some of the wireless devices 232, 234, 236, 242, 244 may be Cat-M1 or NB-IoT devices.

In accordance with embodiments described herein, the access nodes 210 and 220 may assign discard timers having differing values to the wireless devices 232, 234, 236, 242, 244 based on their location and/or RF conditions reported. The assignment of a discard timer may further be based on bandwidth in the corresponding cell and congestion in the cell. The assignment of the discard timer may further be based on a type of application session, i.e, GBR session or non-GBR session.

Figure 3:
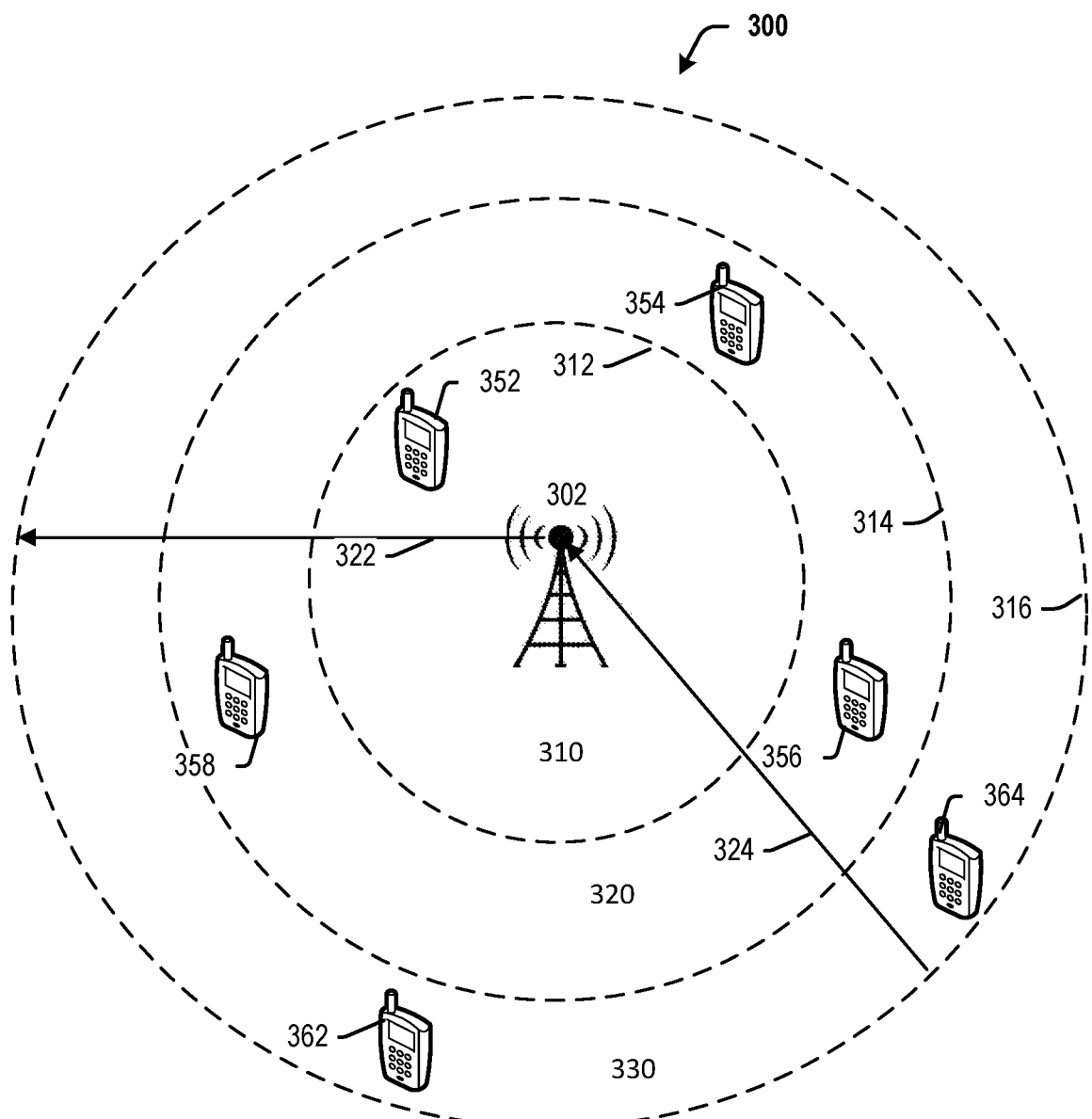
FIG. 3 depicts areas within a network having different signal performance parameter ranges in accordance with disclosed embodiments.

FIG. 3 depicts an exemplary environment 300 for embodiments set forth herein. A single access node 302 may deploy one or more RATs. Various areas may be predefined as coverage areas of the access node 302. A first area 310 may be defined between the access node 302 and a boundary 312. A second area 320 may be defined between boundaries 312 and 314, and a third area 330 may be defined between boundary 314 and boundary 316. Boundary 316 may correspond with an edge of a coverage area of access node 302. Signal parameters may vary between the access node 302 and the boundary 316. Specifically, signal parameters generally deteriorate as devices progress towards the boundary 316. However, signal quality may also decrease in areas confronted with environment or geographical signal barriers.

As shown by arrow 324, RSRP and/or signal to noise plus interference (SINR) or RSRQ may decrease with distance from area 310 to area 320 and from area 320 to area 330. This may be due to distance from the access node or based on other factors such as geographical or environment factors impacting signal performance. Thus, the boundaries 312, 314, and 316 may be selected based on the signal parameters, such as path loss, RSRP, SINR, CINR, and/or other parameters.

In technologies deployed by the access node 302 such as NB-IoT and Cat M1 a coverage enhancement (CE) feature may be provided. Three CE levels may be configured including a lowest CE level 0, an intermediate CE level 1, and a highest CE level 2. UEs connected in higher CE levels can consume more resources then UEs in lower CE levels and have a negative impact on network QoS. A base level (CE level 0) 310 and two coverage extension levels, CE level 1 320, and CE level 2 330 may be provided. Logic provided in the network may choose the areas for the CE levels based on signal conditions, such as RSRP, RSRQ, CINR, SINR, and/or path loss. In the CE areas CE level 1 and CE level 2, coverage is improved by increasing a number of repetitions in the uplink and downlink. Reliable coverage enhancement is achieved by the repeated transmission of data and control signaling. Each transmission can be configured to repeat for a designated number of times in order to achieve higher success opportunities at the desired coverage level. Thus, transmissions in CE level 2 330 may be configured to be repeated a greater number of times than transmissions in CE level 1 320. Likewise, transmission is CE level 1 320 may be configured to be repeated a greater number of times than transmissions in CE level 0 310. When pathloss at the desired coverage is high or RSRP, CINR, or SINR is low relative to other regions within the coverage area, a greater number of repetitions can be configured.

Although the CE levels and predefined areas are illustrated as being a particular distance from the access node, it should be noted that the areas are selected based on signal parameters and therefore are not necessarily proportionately distant from the access node 302. For example, in outdoor areas, outside of buildings, coverage extension may not be required as signal parameters may be strong. In indoor spaces, areas above ground may not require coverage extensions, but areas underground rill likely require a coverage extension. For example, CE level 0 might be located outside, CE level 1 might be located on an upper floor of a building, and CE level 2 might be located in a basement of a building. More energy is required to transmit signals in coverage extension areas. More repetitions and a longer round trip time between sending and receiving are also generally required in coverage extension areas.

In operation, UE 352 may be operating within area 310, UEs 354, 356, and 358 may operate within area 320, and UEs 362 and 364 may operate within area 330. The UEs may be connected to the access node 302, using a particular technology, for example NB-IoT technology. Embodiments provided herein may further base selection of a discard timer on the CE level of the wireless device. For example, wireless devices in CE level 2 may require a longer discard timer than wireless devices in CE level 0. The selection of discard timer may be based on CE level in addition to factors such as bandwidth, congestion, and application type as described above.

Figure 4:
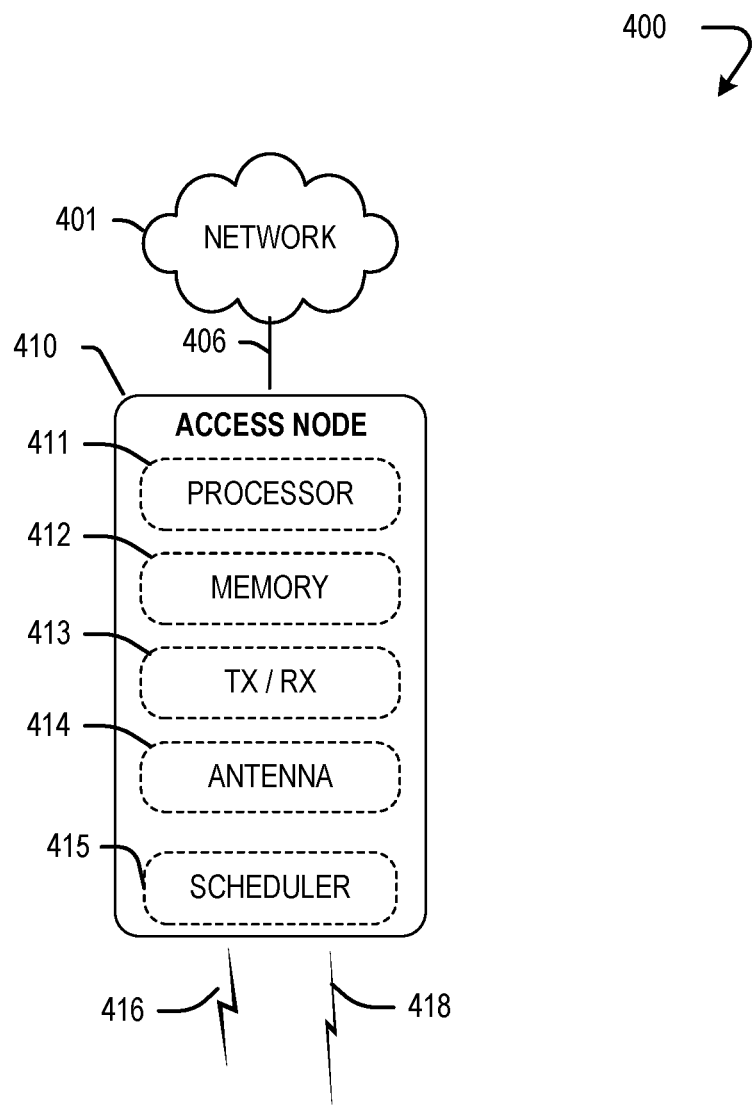
FIG. 4 depicts an exemplary configuration of an access node in accordance with disclosed embodiments.

FIG. 4 depicts an exemplary access node 410. Access node 410 may comprise, for example, a macro-cell access node, such as access nodes 210 and 220 described with reference to FIG. 2. Access node 410 may be connected to a network 401 using communication link 406. Access node 410 is illustrated as comprising a processor 411, memory 412, transceiver(s) 413, antenna(s) 414, and scheduler 417. Processor 411 executes instructions stored on memory 412, while transceiver(s) 413 and antenna(s) 414 enable wireless communication with other network nodes, such as wireless devices and other nodes.

For example, access node 410 may be configured to detect wireless devices located in different predefined areas and monitor the locations of a wireless device with respect to a threshold. Alternatively or additionally, the access node 410 may be configured to monitor RF conditions for each wireless device. The wireless devices may report RF conditions to the access node 410, for example, through a UE capability report or channel state information (CSI) report. Further, the access node 410 may be configured to monitor bandwidth in a cell with respect to a threshold, and congestion in a cell with respect to a threshold. Additionally, the access node 410 may be configured to monitor data sessions to determine whether wireless devices are implementing a GBR or non-GBR data session.

The access node 410 may further be configured to dynamically select a discard timer for each wireless device or for a group of wireless devices based on the monitoring described above. Scheduler 415 may be provided for scheduling resources based on the presence of the wireless devices. These features may be enabled by access node 410 comprising two co-located cells, or antenna/transceiver combinations that are mounted on the same structure. Network 401 may be similar to network 101 discussed above. Wireless communication links 416 and 418 may provide communication with the access node 410 over one or more RATs. In some embodiments, the wireless devices may operate in NB-IoT mode or Cat M1 mode enabling the wireless devices to communicate with access node 410 over a relatively narrow bandwidth.

Further, instructions stored on memory 412 can include instructions for dynamically assigning a discard timer to a wireless device. The instructions may further be configured to dynamically assign a discard timer to a group of wireless devices, for example, wireless devices in a particular CE area. Methods for dynamically assigning a discard timer are further explained below with reference to FIGS. 5-7. The instructions may facilitate setting definitions of thresholds for the various parameters described herein, monitoring the parameters and comparing them to the defined thresholds, and assigning discard timers based on the comparisons.

Figure 5:
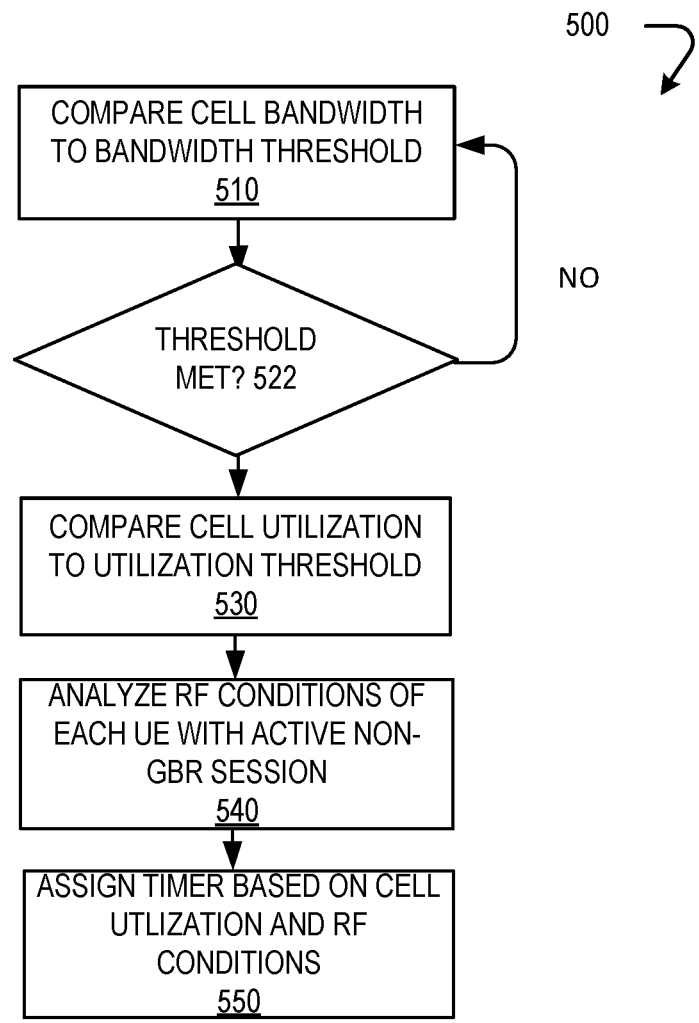
FIG. 5 depicts an exemplary method for assigning a discard timer in accordance with disclosed embodiments.

The disclosed methods for performing discard timer assignment are further described with references to FIGS. 5-7 below. FIG. 5 illustrates an exemplary method 500 for dynamic discard timer assignment in accordance with disclosed embodiments. Method 500 may be performed by any suitable processor discussed herein, for example, a processor included in the access node 410. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 500 starts in step 510 when the access node 410 or similar component compares cell bandwidth to a preset bandwidth threshold. For example, a bandwidth threshold of 50 MHz may be set. If, in step 522, the threshold is not met, i.e., the bandwidth is greater than 50 MHz, then UEs in the cell with the bandwidth greater than 50 MHz remain subject to a default discard timer.

However, if in step 522, the threshold is met, e.g., the bandwidth is 50 MHz or less, the access node 410 compares cell utilization to a cell utilization threshold in step 530. The cell utilization may be a measure of congestion in a cell and may be measured, for example, by a number of connected wireless devices or alternatively by consumed resource blocks or percentage of resource blocks being utilized. The cell utilization measurement may be instantaneous or alternatively may be historic. For example, the cell utilization measurement can be calculated as a percentage of physical resource block (PRB) usage over time. The threshold may for example be 70% of PRB. Thus, if cell utilization is less than the threshold, the access node 410 will not flag the cell as congested. However, if the cell utilization meets the 70% threshold, the access node 410 may flag the cell as congested in step 530.

In step 540, the access node 410 analyzes conditions of a wireless device with an active non-GBR session. It should be noted that if the device is not engaged in an active non-GBR session, then a default discard timer may be used. In step 550, the access node 410 assigns a discard timer to the UE based on whether the cell utilization threshold is met and the RF conditions of the wireless device.

For example, in embodiments set forth herein, two discard timers (Long T1 and Short T1) are configured for instances in which the cell utilization threshold is not met and two discard timers (Long T2 and Short T2) are configured for instances in which the cell utilization threshold is not met. Thus, in a non-congested cell, each wireless device is assigned a discard timer corresponding to either Long T1 or Short T1 depending on the wireless device RF conditions and in the congested cell. In the congested cell, each wireless device is assigned a discard timer corresponding to Long T2 or Short T2 depending upon the RF conditions. The first set of timers, Long T1 and Short T1 may have lower values than the corresponding T2 timers as it may not be necessary to wait as long to discard packets in a non-congested cell than in a congested cell. Assignment of short or long discard timer values may be accomplished by the access node 410 sending a radio resource control (RRC) reconfiguration message to the UE.

As set forth above, the PDCP discard timer indicates the delay before a PDCP PDU along with the corresponding PDCP SDU is discarded from the buffer. In accordance with embodiments set forth herein, this timer is set in a manner that maintains packet delay defined by the quality of service identifier (QCI) characteristics. The timer can be disabled by setting it to infinity. Some exemplary values for the discard timer include 50 ms, 100 ms, 150 ms, 300 ms, 500 ms, 750 ms, 1500 ms, and infinity. Other values are within scope of the disclosure. Further, each non-GBR quality of service identifier (QCI) or quality of service flow identifier (QFI) can further have separate discard timers.

In embodiments set forth herein, discard timers may be assigned using at least two different approaches. FIG. 6 illustrates a method for assigning discard timers which is based on UE measurement of channel conditions. These UE measurements can be made periodically and reported to the access node, for example through a UE capability report or a channel state information (CSI) report. FIG. 7 illustrates a method for setting discard timers based on how far a UE is from a cell center or timing advance. Because UE measurement reports can waste resources and reduce throughput, the timing advance method may be preferable when throughput is critical within a network.

Figure 6:
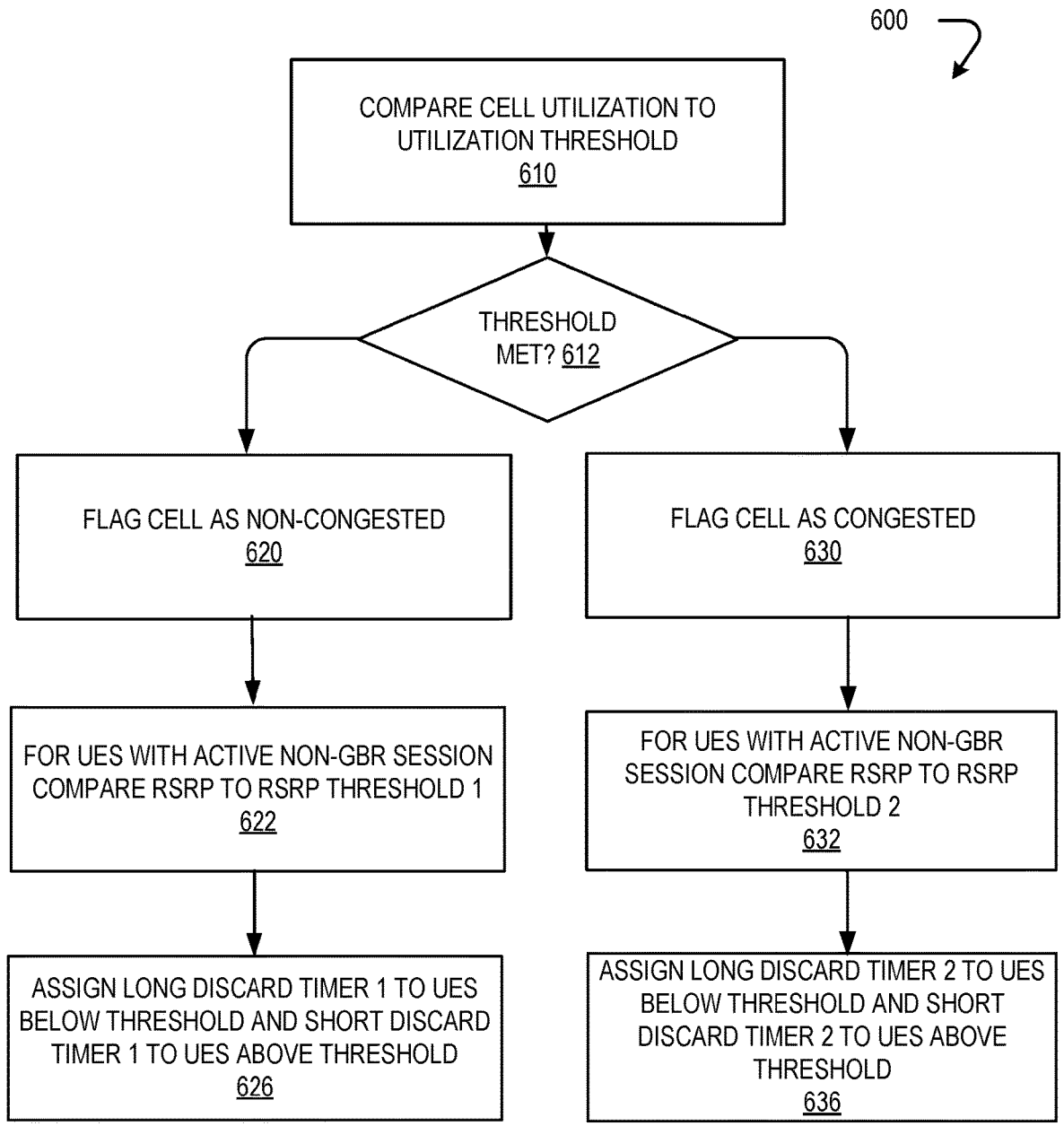
FIG. 6 depicts an additional exemplary method for assigning a discard timer in accordance with disclosed embodiments.

FIG. 6 depicts an exemplary method for discard timer assignment in accordance with disclosed embodiments. Although FIG. 6 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 600 starts in step 610 when a processor, such as the processor of access node 410 compares cell utilization to a utilization threshold. As set forth above, the utilization may be measured for example, by a percentage of resource block usage or by a number of devices in a cell. The threshold may be a preset threshold, and may be stored in and retrieved from a memory of the access node, such as access node 410.

If the threshold is met in step 612, i.e, the percentage of resource blocks utilized meets the threshold, then the processor of the access node flags the cell as congested in step 630. Alternatively, if the threshold is not met, the processor of the access node flags the cell as non-congested in step 620. Thus, in embodiments set forth herein, one set of timers applies to congested cells and another set of timers applies to non-congested cells.

In step 620, when the cell is flagged as non congested, the processor determines that the wireless device has an active non-GBR session and compares RF parameters, such as RSRP and RSRQ of the wireless device to a pre-set threshold that may be stored in and retrieved from a memory of the access node 410. In embodiments set forth herein, both the RSRP and RSRQ must meet respective first thresholds in order to determine that the threshold is met. If one of the RSRP and RSRQ does not meet the first threshold, then the threshold is not met.

In step 626, in the non-congested cell, a discard timer Long T1 is assigned to UEs that meet the RF conditions threshold and a discard timer Short T1 is assigned to UEs that do meet the RF conditions threshold. Thus, when RF conditions are poor, the Long T1 timer may be assigned. However, when RF conditions are good, the Short T1 timer may be assigned.

In step 630, when the cell is flagged as congested, the processor of the access node 410 identifies UEs with an active non-GBR session and compares the RF parameters, e.g., RSRP and RSRQ of these UEs in the congested cell to second thresholds in step 632. In embodiments set forth herein, both the RSRP and RSRQ must meet respective second thresholds in order to determine that the threshold is met. If one of the RSRP and RSRQ does not meet the second threshold, then the threshold is not met. If the threshold is not met, the processor assigns the UEs to discard timer Long T2. If the threshold is met, the processor assigns the UEs to discard timer Short T2. Thus, when RF conditions are poor, the Long T1 timer may be assigned. However, when RF conditions are good, the Short T1 timer may be assigned.

Thus, in a non-congested cell, each wireless device is assigned a discard timer corresponding to Long T2 or short T2 depending on the RF conditions of the wireless device. For example, when the RF conditions of a wireless device meet a particular threshold or are below the threshold in a congested cell where the cell utilization threshold is met, the wireless device may be assigned discard timer long T2 and when the RF conditions are better than the pre-defined threshold, the wireless device may be assigned the discard timer Short T2. Assignment of short or long discard timer values may be accomplished by the access node 410 sending a radio resource control (RRC) reconfiguration message to the UE.

Figure 7:
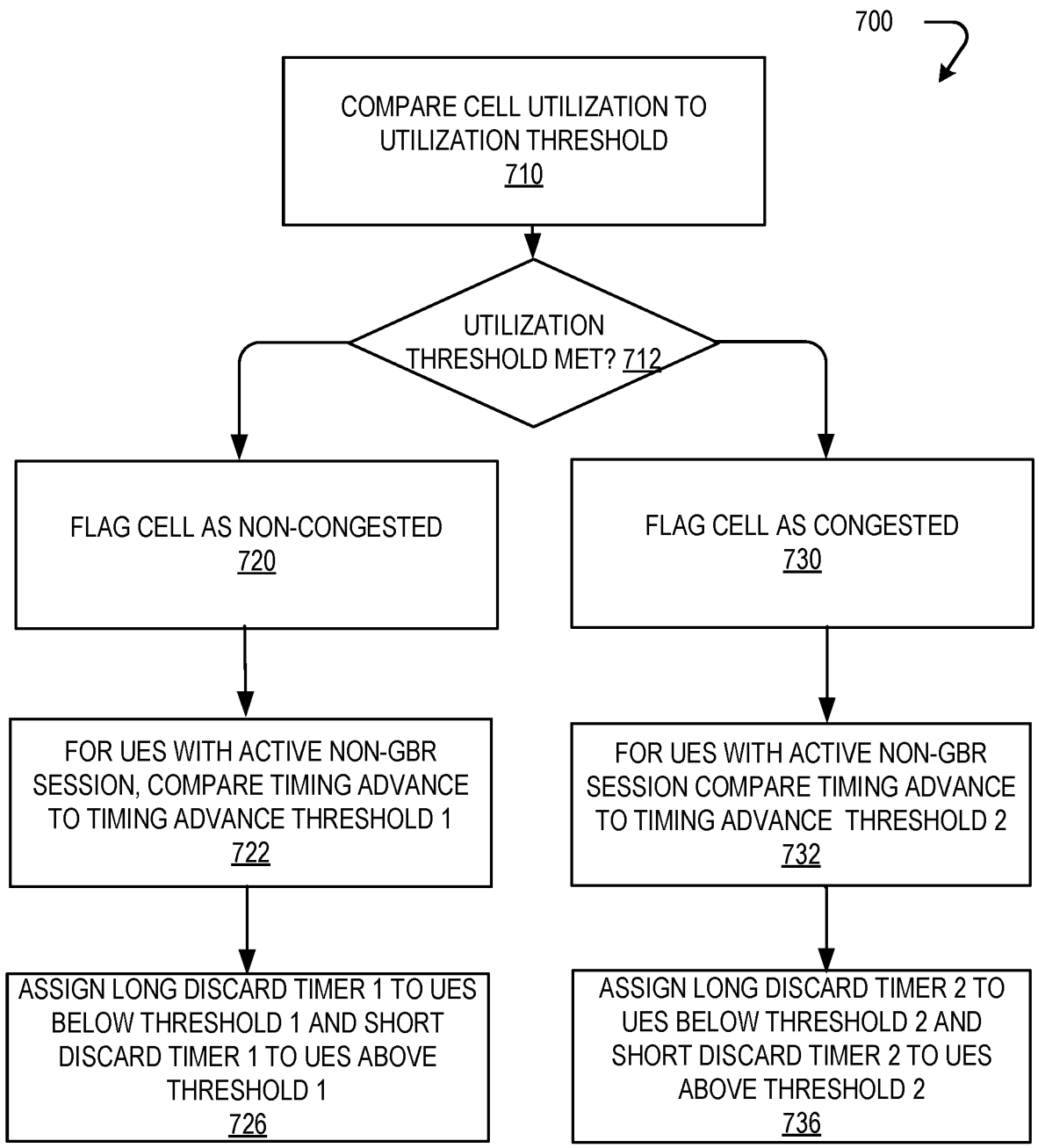
FIG. 7 depicts another exemplary method for assigning a discard timer in accordance with disclosed embodiments.

FIG. 7 depicts another exemplary method for assigning discard timers in accordance with disclosed embodiments. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

Method 700 may be performed by a processor, for example processor 411 of access node 410. In step 710, compares cell utilization to a utilization threshold. As set forth above, the utilization may be measured for example, by a percentage of resource block usage or by a number of devices in a cell. The threshold may be a preset threshold, and may be stored in and retrieved from a memory of the access node, such as access node 410.

If the threshold is met in step 712, i.e, the percentage of resource blocks utilized meets the threshold percentage of resource blocks, then the processor of the access node 410 flags the cell as congested in step 720. Alternatively, if the threshold is not met, the processor of the access node 410 flags the cell as non-congested in step 730.

In the non-congested cell, in step 722, for UEs with active non-GBR sessions, the processor 411 compares the timing advance of the UE to a timing advance threshold 1. To obtain timing advance information about the UE, the access node 410 can use triangulation to estimate the location of UE based on angle and delay parameters. At cell edge regions, timing advance will be higher and closer to the cell center, timing advance will be lower.

The processor 411 assigns a discard timer Large 1 to the UE when the timing advance is below the threshold 1 and a discard timer Short 1 to UEs having a timing advance above the threshold 1.

Conversely, in the congested cells as determined in step 730, the processor identifies UEs with active non-GBR sessions and compares the timing advance of the UEs to a timing advance threshold 2 in step 732. For UEs having a timing advance below the threshold 2, the processor 411 assigns a discard timer Large 2 to the UEs. For UEs having a timing advance above the threshold 2, the processor 411 assigns a discard timer Short 2 to the UEs. Thus, in embodiments set forth herein, one set of timers applies to congested cells and another set of timers applies to non-congested cells. Assignment of short or long discard timer values may be accomplished by the access node 410 sending a radio resource control (RRC) reconfiguration message to the UE.

In the illustrated embodiments, threshold 1 values may be lower than threshold 2 values. Thus, cells that are congested, lower thresholds are implemented than in cells that that are not congested. Further, while only two thresholds are illustrated, additional thresholds and corresponding timers may be added based on network requirements. Thus, each time a threshold is added, two additional discard timers are also added. Further, in embodiments set forth herein, shorter timer durations may be used for the first set of timers in the non-congested cell than for the second set of timers in the congested cell.

Although FIG. 7 is described in conjunction with UEs generally, it should be noted that the method of FIG. 7 is easily adaptable to Cat-M1 and NB-IoT devices, based on CE levels. For example, with reference to FIG. 3, typically, devices located in CE level 2 330, have a longer timing advance than those located in CE level 1 320 or CE level 0 310. Thus, for example, the processor 411 of the access node 410 may use the boundaries of the CE levels as timing advance thresholds for these types of devices.

In some embodiments, methods 500, 600, and 700 may include additional steps or operations. For example, in embodiments set forth herein, methods 600 and 700 are performed only when the bandwidth threshold identified in relation to FIG. 5 is met. Thus, the methods may include steps shown in each of the other methods. As one of ordinary skill in the art would understand, the methods 500, 600, and 700 may be integrated in any useful manner.

By the methods described herein, discard timers are dynamically assigned in order to enhance overall UE performance. The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
    evaluating cell utilization for a cell with respect to a cell utilization threshold;
    identifying a wireless device session for a wireless device within the cell as a non-guaranteed bit rate (GBR) session;
    evaluating RF conditions for the wireless device with respect to an RF conditions threshold; and
    selecting a discard timer for the wireless device based on the evaluation of the cell utilization with respect to the cell utilization threshold and the evaluation of the RF conditions with respect to the RF conditions threshold.

2. The method of claim 1, further comprising determining that cell bandwidth for the cell is below a predefined bandwidth threshold.

3. The method of claim 1, wherein the RF conditions threshold is defined by reference signal received power (RSRP) and reference signal received quality (RSRQ).

4. The method of claim 1, wherein the RF conditions threshold is defined by a location of the wireless device.

5. The method of claim 1, further comprising identifying the cell as a congested cell when the cell utilization is above the cell utilization threshold and identifying the cell as a non-congested cell when the cell utilization is below the cell utilization threshold.

6. The method of claim 5, further comprising defining a first RF conditions threshold, a first long discard timer, and a first short discard timer for the non-congested cell and defining a second RF conditions threshold, a second long discard timer and a second short discard timer for the congested cell.

7. The method of claim 6, wherein the first RF conditions threshold is lower than the second RF conditions threshold.

8. The method of claim 6, further comprising assigning the first long discard timer to wireless devices in the non-congested cell with RF conditions below the first RF condition threshold.

9. The method of claim 6, further comprising assigning the first short discard timer to wireless devices in the non-congested cell with RF conditions above the first RF condition threshold.

10. The method of claim 6, further comprising assigning the second long discard timer to wireless devices in the congested cell with RF conditions below the second RF condition threshold.

11. The method of claim 6, further comprising assigning the second short discard timer to wireless devices in the congest cell with RF conditions above the second RF condition threshold.

12. A system comprising:
    at least one processor programmed to perform operations including;
        evaluating cell utilization for a cell with respect to a cell utilization threshold and defining the cell as congested or non-congested based on the evaluation;
        evaluating RF conditions for a wireless device with respect to a first RF conditions threshold for the non-congested cell and a second RF conditions threshold for the congested cell; and
    selecting a discard timer for the wireless device based on the evaluation of the cell utilization with respect to the cell utilization threshold and the evaluation of the RF conditions with respect to the RF conditions thresholds.

13. The system of claim 12, the operations further including identifying a wireless device session for a wireless device within the cell as a non-guaranteed bit rate (GBR) session.

14. The system of claim 12, further comprising determining that cell bandwidth for the cell is below a predefined bandwidth threshold.

15. The system of claim 12, wherein the RF conditions threshold is defined by reference signal received power (RSRP) and reference signal received quality (RSRQ).

16. The system of claim 12, wherein the RF conditions threshold is defined by a location of the wireless device.

17. The system of claim 12, further comprising defining a first long discard timer and a first short discard timer for the non-congested cell and defining a second long discard timer and a second short discard timer for the congested cell.

18. A method comprising:
    evaluating cell utilization for a cell with respect to a cell utilization threshold and defining the cell as congested or non-congested based on the evaluation;
    evaluating RF conditions for the wireless device with respect to a first RF conditions threshold for the non-congested cell and a second RF conditions threshold for the congested cell; and
    selecting a discard timer for the wireless device based on the evaluation of the cell utilization with respect to the cell utilization threshold and the evaluation of the RF conditions with respect to the RF conditions thresholds.

19. The method of claim 18, further comprising defining a first long discard timer and a first short discard timer for the non-congested cell and defining a second long discard timer and a second short discard timer for the congested cell.

20. The method of claim 19, further comprising assigning the first long discard timer to wireless devices in the non-congested cell with RF conditions below the first RF condition threshold, assigning the first short discard timer to wireless devices in the non-congested cell with RF conditions above the first RF condition threshold, assigning the second long discard timer to wireless devices in the congested cell with RF conditions below the second RF condition threshold, and assigning the second short discard timer to wireless devices in the congested cell with RF conditions above the second RF condition threshold.

* * * * *